United States Patent
Hatanaka

(10) Patent No.: US 9,145,060 B2
(45) Date of Patent: Sep. 29, 2015

(54) PROPULSION CONTROL APPARATUS FOR ELECTRIC MOTOR CAR

(75) Inventor: Keita Hatanaka, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/235,641

(22) PCT Filed: Jul. 29, 2011

(86) PCT No.: PCT/JP2011/067489
§ 371 (c)(1),
(2), (4) Date: Jan. 28, 2014

(87) PCT Pub. No.: WO2013/018167
PCT Pub. Date: Feb. 7, 2013

(65) Prior Publication Data
US 2014/0207322 A1    Jul. 24, 2014

(51) Int. Cl.
*B60L 11/18* (2006.01)
*B60L 9/18* (2006.01)
(Continued)

(52) U.S. Cl.
CPC . *B60L 9/18* (2013.01); *B60L 1/003* (2013.01); *B60L 3/003* (2013.01); *B60L 8/003* (2013.01);
(Continued)

(58) Field of Classification Search
CPC ............. B60L 3/003; B60L 9/00; B60L 9/16; B60L 9/18; B60L 9/20; B60L 9/22; B60L 9/32; B60L 11/1803; B60L 11/1809; B60L 11/1811; B60L 11/1812; B60L 11/1804; B60L 15/002; B60L 15/007; B60L 15/02; B60L 15/04; B60L 15/20; B60L 2200/26; B60L 2200/30; B60L 2200/36; B60L 2240/421; B60W 2300/40; Y02T 10/7241
See application file for complete search history.

(56) References Cited

U.S. PATENT DOCUMENTS

2013/0113279 A1 * 5/2013 Hatanaka ................. 307/9.1

FOREIGN PATENT DOCUMENTS

| JP | 8-009510 A | 1/1996 |
| JP | 2005-287129 A | 10/2005 |
| JP | 2008-228420 A | 9/2008 |

OTHER PUBLICATIONS

International Search Report (PCT/ISA/210) mailed on Aug. 30, 2011, by the Japanese Patent Office as the International Searching Authority for International Application No. PCT/JP2011/067489.
(Continued)

Primary Examiner — Jerrah Edwards
(74) Attorney, Agent, or Firm — Buchanan Ingersoll & Rooney PC

(57) ABSTRACT

A propulsion control apparatus includes first and second power converting units capable of performing bidirectional power flow control, an ACL provided on each alternating-current end side of the power converting units, a first switching device performing connection switching to connect a power storage device or a direct-current overhead wire to each direct-current end of the power converting units, a second switching device switching connection of the alternating-current end of the first power converting unit to either the ACL or an AC motor side, a third switching device switching connection of the alternating-current end of the second power converting unit to either the ACL or the AC motor side, a fourth switching device switching connection of the AC motor to either the first power converting unit side or the second power converting unit side, and a control unit controlling operations of the power converting units and the switching devices.

19 Claims, 12 Drawing Sheets

(51) Int. Cl.
| | | |
|---|---|---|
| B60L 1/00 | (2006.01) | |
| B60L 3/00 | (2006.01) | |
| B60L 8/00 | (2006.01) | |
| B60L 9/22 | (2006.01) | |
| B60L 11/00 | (2006.01) | |
| B60L 11/16 | (2006.01) | |
| B60L 15/00 | (2006.01) | |
| B60L 15/20 | (2006.01) | |

(52) U.S. Cl.
CPC .............. *B60L 9/22* (2013.01); *B60L 11/005* (2013.01); *B60L 11/16* (2013.01); *B60L 11/1803* (2013.01); *B60L 11/1887* (2013.01); *B60L 15/007* (2013.01); *B60L 15/20* (2013.01); *B60L 2200/26* (2013.01); *B60L 2200/32* (2013.01); *B60L 2200/36* (2013.01); *B60L 2200/40* (2013.01); *B60L 2210/10* (2013.01); *B60L 2240/421* (2013.01); *Y02T 10/644* (2013.01); *Y02T 10/7022* (2013.01); *Y02T 10/7083* (2013.01); *Y02T 10/7216* (2013.01); *Y02T 10/7275* (2013.01); *Y02T 90/34* (2013.01); *Y10T 307/406* (2015.04)

(56) References Cited

OTHER PUBLICATIONS

Written Opinion (PCT/ISA/237) mailed on Aug. 30, 2011, by the Japanese Patent Office as the International Searching Authority for International Application No. PCT/JP2011/067489.

\* cited by examiner

FIG.12

| | SW1 | SW2 | SW3 | SW4 | SW5 | SW6 | SW7 | SW8 | SW9 | SW10 | SW11 | POWER CONVERTING UNIT 9 | POWER CONVERTING UNIT 10 | AC MOTOR 13 | AC MOTOR 13a | AC MOTOR 13b | CORRESPONDING FIGURE |
|---|---|---|---|---|---|---|---|---|---|---|---|---|---|---|---|---|---|
| (1) CHARGING OF POWER STORAGE DEVICE (CHARGING OPERATION 1) | A | A | A | B | A | B | B | B | A | B | ARBITRARY | CH1 | CH2 | STOPPED | | | FIG.2 |
| (2) MOTOR DRIVING BY DIRECT-CURRENT OVERHEAD WIRE (MOTOR DRIVING 1) | A | A | A | A | ARBITRARY | ARBITRARY | ARBITRARY | ARBITRARY | ARBITRARY | ARBITRARY | A | INVERTER | OFF | DRIVEN | | | FIG.3 |
| (3) MOTOR DRIVING BY POWER STORAGE DEVICE (MOTOR DRIVING 2) | ARBITRARY | ARBITRARY | ARBITRARY | ARBITRARY | ARBITRARY | ARBITRARY | ARBITRARY | ARBITRARY | B | ARBITRARY | B | OFF | INVERTER | DRIVEN | | | FIG.4 |
| (4) CHARGING OF POWER STORAGE DEVICE (CHARGING OPERATION 2) | B | B | A | B | A | A | A | A | B | B | ARBITRARY | CH2 | CH1 | STOPPED | | | FIG.5 |
| (5) MOTOR DRIVING BY DIRECT-CURRENT OVERHEAD WIRE (MOTOR DRIVING 3) | B | ARBITRARY | ARBITRARY | A | ARBITRARY | ARBITRARY | A | ARBITRARY | B | ARBITRARY | B | OFF | INVERTER | DRIVEN | | | FIG.6 |
| (6) MOTOR DRIVING BY POWER STORAGE DEVICE (MOTOR DRIVING 4) | ARBITRARY | B | A | B | A | A | B | A | B | ARBITRARY | A | INVERTER | OFF | DRIVEN | | | FIG.7 |
| (7) MOTOR DRIVING BY DIRECT-CURRENT OVERHEAD WIRE (MOTOR DRIVING 5) | A | A | A | A | A | ARBITRARY | ARBITRARY | B | A | B | B | STEP-DOWN CH | INVERTER | DRIVEN | | | FIG.8 |
| (8) MOTOR DRIVING BY POWER STORAGE DEVICE (MOTOR DRIVING 6) | ARBITRARY | B | A | A | B | A | A | B | B | B | A | INVERTER | STEP-DOWN CH | DRIVEN | | | FIG.9 |
| (9) MOTOR DRIVING BY BOTH POWER STORAGE DEVICE AND DIRECT-CURRENT OVERHEAD WIRE (MOTOR DRIVING 7) | A | A | A | A | ARBITRARY | ARBITRARY | B | B | B | ARBITRARY | | INVERTER | INVERTER | | DRIVEN | DRIVEN | FIG.10 |
| (10) MOTOR DRIVING BY BOTH POWER STORAGE DEVICE AND DIRECT-CURRENT OVERHEAD WIRE (MOTOR DRIVING 8) | B | B | A | A | ARBITRARY | A | A | B | B | ARBITRARY | | INVERTER | INVERTER | | DRIVEN | DRIVEN | FIG.11 |

PROPULSION CONTROL APPARATUS FOR ELECTRIC MOTOR CAR

FIELD

The present invention relates to a propulsion control apparatus for an electric motor car including a power storage device.

BACKGROUND

As conventional propulsion control apparatuses for electric motor cars including power storage devices, for example, in a propulsion control apparatus described in Patent Literature 1 (in the literature, disclosed as a charging and discharging control apparatus), a configuration mounted with two power conversion devices formed by a bidirectional step-up/down chopper that converts a direct-current voltage received from an overhead wire into a direct-current voltage for a power storage device and an inverter that converts direct-current power into alternating-current power and drives a motor is disclosed.

CITATION LIST

Patent Literature

Patent Literature 1: Japanese Patent Application Laid-Open No. 2008-228420 ("0007", FIG. 1)

SUMMARY

Technical Problem

However, in the propulsion control apparatus described in Patent Literature 1, there is a problem in that, although the two power converting units formed by the bidirectional step-up/down chopper and the inverter are mounted, a car cannot travel when one of the power converting units breaks down.

The present invention has been devised in view of the above and it is an object of the present invention to provide a propulsion control apparatus for an electric motor car that enables, even when one power converting unit breaks down, car traveling with the other power converting unit.

Solution to Problem

In order to solve the above problems and achieve the object, the present invention is a propulsion control apparatus for an electric motor car that includes that includes a power storage device and an alternating-current motor and performs propulsion control on the alternating-current motor using direct-current power supplied from a direct-current overhead wire and the power storage device, the apparatus including: first and second power converting units that are capable of performing bidirectional power flow control and operate as at least any one of a step-up chopper, a step-down chopper, a step-up/down chopper, and an inverter according to a connection form; an alternating-current reactor provided on a side of each of alternating-current ends of the first and second power converting units; a first switching device that performs connection switching such that one of the power storage device and the direct-current overhead wire is connected to each of direct-current ends of the first and second power converting units; a second switching device that switches a connection of the alternating-current end of the first power converting unit to either the alternating-current reactor or the alternating-current motor side; a third switching device that switches a connection of the alternating-current end of the second power converting unit to either the alternating-current reactor or the alternating-current motor side; a fourth switching device that switches a connection of the alternating-current motor to either the first power converting unit side or the second power converting unit side; and a control unit that controls an operation of the first and second power converting units and an operation of the first to fourth switching devices.

Advantageous Effects of Invention

According to the present invention, there is an effect that, even when one power converting unit breaks down, car traveling is enabled by the other power converting unit.

BRIEF DESCRIPTION OF DRAWINGS

FIG. 12 is a diagram of a list in a table format of the operations shown in FIG. 2 to FIG. 11.

DESCRIPTION OF EMBODIMENTS

A propulsion control apparatus for an electric motor car (hereinafter simply referred to as "propulsion control apparatus") according to an embodiment of the present invention is explained below with reference to the accompanying drawings. Note that the present invention is not limited by the embodiment explained below.

Figure 1:
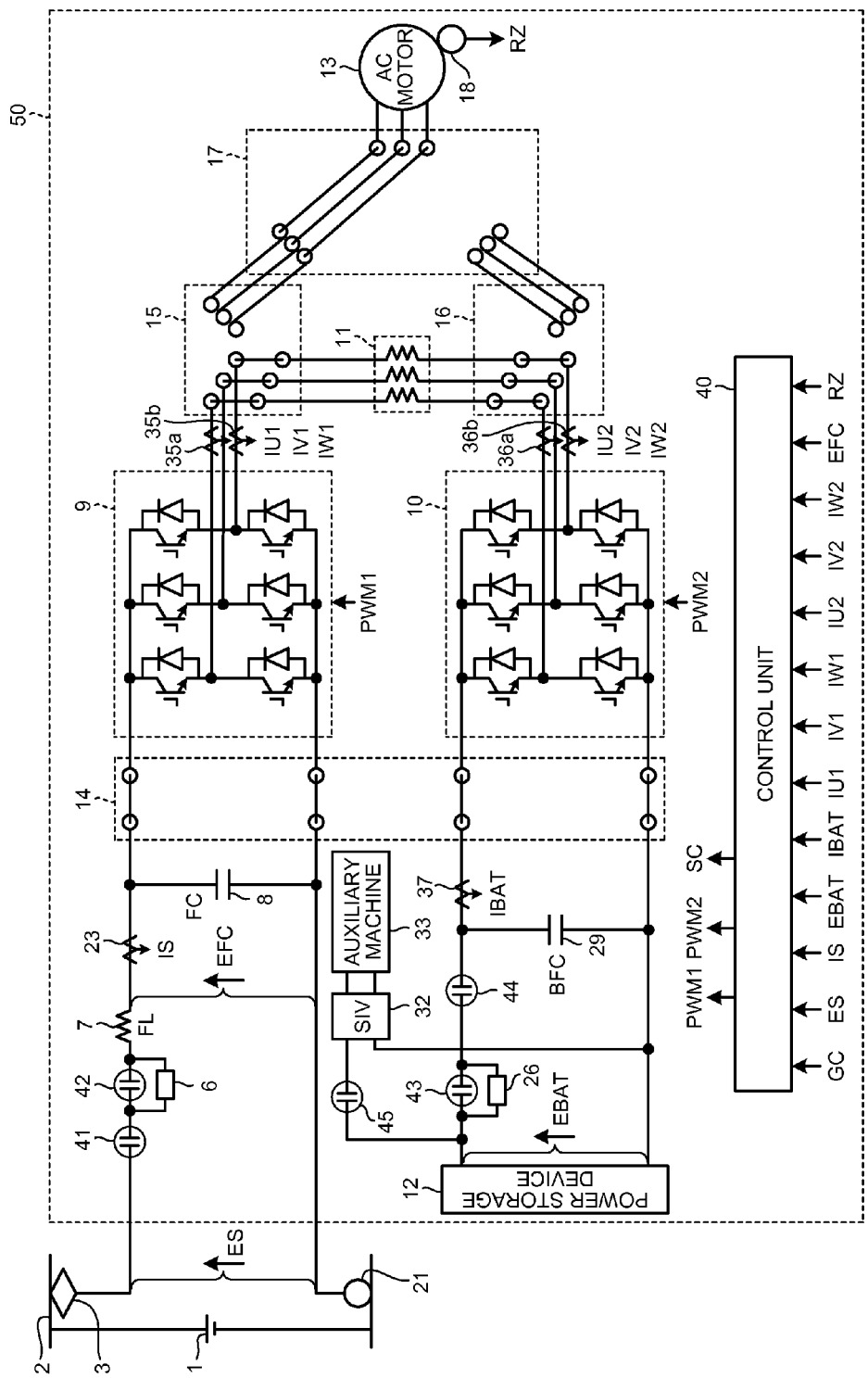
FIG. 1 is a diagram of a configuration example of a propulsion control apparatus according to an embodiment of the present invention.

FIG. 1 is a diagram of a configuration example of the propulsion control apparatus according to the embodiment of the present invention. In FIG. 1, a propulsion control apparatus 50 in this embodiment is configured as an apparatus that uses, as an input power supply, electric power received via a power collector 3 from a direct-current overhead wire 2 connected to a direct-current power supply 1, such as a transformer substation, and subjects an alternating-current motor (AC motor) 13 mounted in a car to propulsion control.

The propulsion control apparatus 50 includes a control unit 40 that controls each unit in the apparatus, switches 41, 42, 43, 44, and 45 for opening and closing circuits in the apparatus, switching devices 14, 15, 16, and 17 for switching circuit connection in the apparatus, a filter reactor (hereinafter described as "FL") 7 and a filter capacitor (hereinafter described as "FC") 8 configuring an LC filter, a power converting unit 9 functioning as a first power converting unit and a power converting unit 10 functioning as a second power converting unit that are composed of a plurality of switching elements, include a power converting function capable of performing bidirectional power flow control, and operate as any one of a step-up chopper, a step-down chopper, a step-up/down chopper, an inverter, and a converter according to a connection form, an AC motor 13 driven by the power converting unit 9 or the power converting unit 10 to rotate a wheel 21, a power storage device 12 composed of a power storage device, such as a secondary battery or an electric double layer capacitor, a battery filter capacitor (hereinafter described as "BFC") 29, a current limiting resistor 6 that prevents an overcurrent caused when the switch 41 is turned on, a current limiting resistor 26 that prevents an overcurrent caused when the switch 44 is turned on, an auxiliary power supply device (Static InVerter: hereinafter describe as "SIV") 32 that converts a direct-current voltage supplied from the power storage device 12 into a three-phase alternating-current voltage, an auxiliary machine 33 that receives power supply from the SIV 32 and operate, the switching device 14 that functions as a first switching device connected to input ends in the power converting units 9 and 10 (note: the power converting units 9 and 10 can perform bidirectional power flow control and both sides can be an input end but, for convenience, direct-current end sides are set as input ends and alternating-current end sides are set as output ends) and that performs connection switching such that one of the direct-current power supply 1 and the power storage device 12 is connected to the input ends, an alternating-current reactor (hereinafter described as "ACL") 11 provided on the output end sides in the power converting units 9 and 10, the switching device 15 functioning as a second switching device that switches a connection of an output of the power converting unit 9 to either the ACL 11 or the AC motor 13 side, the switching device 16 functioning as a third switching device that switches a connection of the output end of the power converting unit 10 to either the ACL 11 or the AC motor 13 side, the switching device 17 functioning as a fourth switching device that switches a connection of the AC motor 13 to either the power converting unit 9 side or the power converting unit 10 side, a speed detector 18 that detects the rotating speed of the AC motor 13, current detectors 35a and 35b provided on the output side of the power converting unit 9 and provided in at least two phases to detect electric currents of phases U, V, and W, current detectors 36a and 36b provided on the output side of the power converting unit 10 and provided in at least two phases to detect electric currents in the phases U, V, and W, a current detector 23 that detects an electric current flowing into the power converting unit 9 and an electric current flowing out from the power converting unit 9, and a current detector 37 that detects an electric current flowing into the power storage device 12 and an electric current flowing out from the power storage device 12.

The configuration explained above is partially additionally explained. The auxiliary machine 33 is an in-car load, such as a light, an air conditioner, or a control device in the car. The direct-current power supply 1 can be a direct-current voltage source, such as a fuel battery or a solar battery. The switching devices 15 to 17 operate as, according to the connecting function explained above, a second switching unit that performs connection switching for switching whether the power converting units 9 and 10 are connected to each other via the ACL 11, the power converting unit 9 is connected to the AC motor 13, or the power converting unit 10 is connected to the AC motor 13. As illustrated in FIG. 1, the switching devices 15 to 17 are configured to collectively switch the connection on the output side of the power converting unit 9 for three phases.

The control unit 40 monitors a voltage EBAT of the power storage device 12, a current detection value IBAT of the current detector 37, a direct-current voltage ES supplied from the direct-current overhead wire 2, a voltage EFC of the FC 8, a rotating speed RZ of the AC motor 13, a current detection value IS of the current detector 23, current detection values IU1, IV1, and IW1 of the current detectors 35a and 35b (note: because detection values for three phases are calculated from detection values for two phases, it is assumed that detection values for three phases are output; the same applies in the following explanation), and current detection values IU2, IV2, and IW2 of the current detectors 36a and 36b. The control unit 40 receives a drive command (hereinafter described as "GC") from a driver, a driver's cab device, or the like. The drive command includes, for example, command information for instructing service operation (power running, braking, coasting, and stopping) for an electric motor car and command information indicating a power reception start operation of the power storage device 12. The control unit 40 generates, based on a result of the monitoring and the drive command GC, a switch command SC for controlling the switches 41 to 45 and the switching devices 14 to 17 and outputs the switch command SC to the switches 41 to 45 and the switching devices 14 to 17 and generates switching commands PWM1 and PWM2 for controlling the power converting units 9 and 10 (more specifically, switching elements configuring the power converting units 9 and 10) and outputs the switching commands PWM1 and PWM2. Note that a method of generating the switching commands PWM1 and PWM2 is publicly known. Detailed explanation of the method is omitted.

First, an electric motor car including the propulsion control apparatus in this embodiment adopts the configuration shown in FIG. 1. Therefore, control operations shown in FIG. 2 to FIG. 11 are possible. In FIG. 2 to FIG. 11, only a main part of the propulsion control apparatus shown in FIG. 1 is shown and a flow of electric power is indicated by an alternate long and short dash line. Note that, in these drawings, a function of the switching device 14 is realized by combining one-circuit two-contact switches (hereinafter described as "SWs") 1 to 3 and SWs 6 to 8 as shown in the figures and functions of the switching devices 15 to 17 are realized by combining one-circuit two-contact SWs 4 and 5 and SWs 9 to 11 as shown in the figures. However, the propulsion control apparatus is not limited to these connection forms and connection configuration. It goes without saying that it is possible to adopt arbitrary connection forms and connection configurations in which operations explained below are possible.

(Charging the Power Storage Device from a Direct-Current Overhead Wire: Charging Operation 1)

Figure 2:
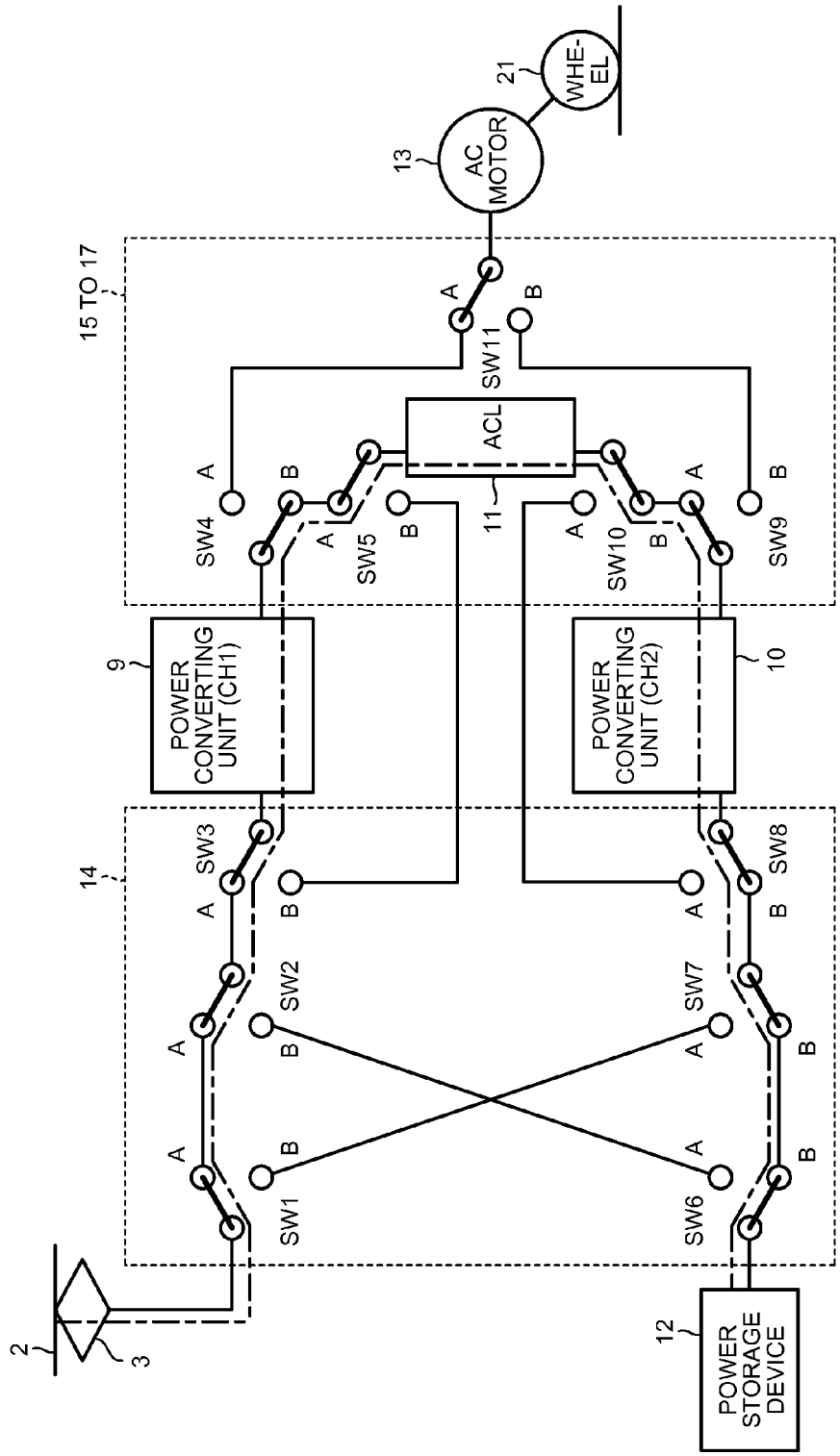
FIG. 2 is a diagram of an operation (a charging operation 1) in charging a power storage device.

FIG. 2 is a diagram of an operation (a charging operation 1) in charging the power storage device 12. In the case of the charging operation 1, as shown in the figure, contacts of the SWs 1 to 3 are set on an A side, a contact of the SW 4 is set on a B side, a contact of the SW 5 is set on the A side, contacts of the SWs 6 to 8 are set on the B side, a contact of the SW 9 is set on the A side, and a contact of the SW 10 is set on the B side. Note that a contact of the SW 11 is arbitrary. The SWs 41 to 45 not shown in FIG. 2 are also set to ON (in the following explanation, unless specifically noted otherwise, it is assumed that the SWs 41 to 45 are set to ON).

In the connection state explained above, a power supply route extending from the direct-current overhead wire 2 to the power storage device 12 through the power converting unit 9, the ACL 11, and the power converting unit 10 is formed. The power converting unit 9 operates as a first chopper (a power converting unit on a side close to the direct-current overhead wire 2 is described as "CH1"; the same applies in the following explanation) and the power converting unit 10 operates as a second chopper (a power converting unit on a side close to the power storage device 12 is described as "CH2"; the same applies in the following explanation) to charge the power storage device 12. The operation shown in FIG. 2 (the charging operation for the power storage device 12) is carried out in a state in which the electric motor car is stopped in a rail yard or a station or a state in which the electric motor car is performing coasting drive in an electrified section.

When the voltage of the direct-current overhead wire 2 is lower than the voltage of the power storage device 12, the power converting units 9 and 10 operate as a step-up chopper. Note that the "step-up chopper" in this embodiment means that the power converting units 9 and 10 operate as a step-up chopper as a whole and does not mean that both the power converting units 9 and 10 need to operate as step-up choppers. When the voltage of the direct-current overhead wire 2 is higher than the voltage of the power storage device 12, the power converting units 9 and 10 operate as a step-down chopper. The "step-down chopper" in this embodiment means that the power converting units 9 and 10 operate as a step-down chopper as a whole and does not mean that both the power converting units 9 and 10 need to operate as step-down choppers.

A connection configuration in which both the two power converting units 9 and 10 are used in charging the power storage device 12 is explained with reference to FIG. 2; however, it is also possible to adopt a connection configuration in which only any one of the power converting units 9 and 10 is used. If a connection configuration is adopted in which, for example, a one-circuit two-contact switch is provided between the SW 7 and the SW 8 and one contact of the switch is connected to the ACL 11 through the contact A of the SW 8 and the contact A of the SW 10, it is possible to charge the power storage device 12 using only the power converting unit 9 without using the power converting unit 10. Note that, with a similar connection configuration, it is also possible to charge the power storage device 12 using only the power converting unit 10 without using the power converting unit 9.

(Motor Driving Performed Using Electric Power of the Direct-Current Overhead Wire: Motor Driving 1)

Figure 3:
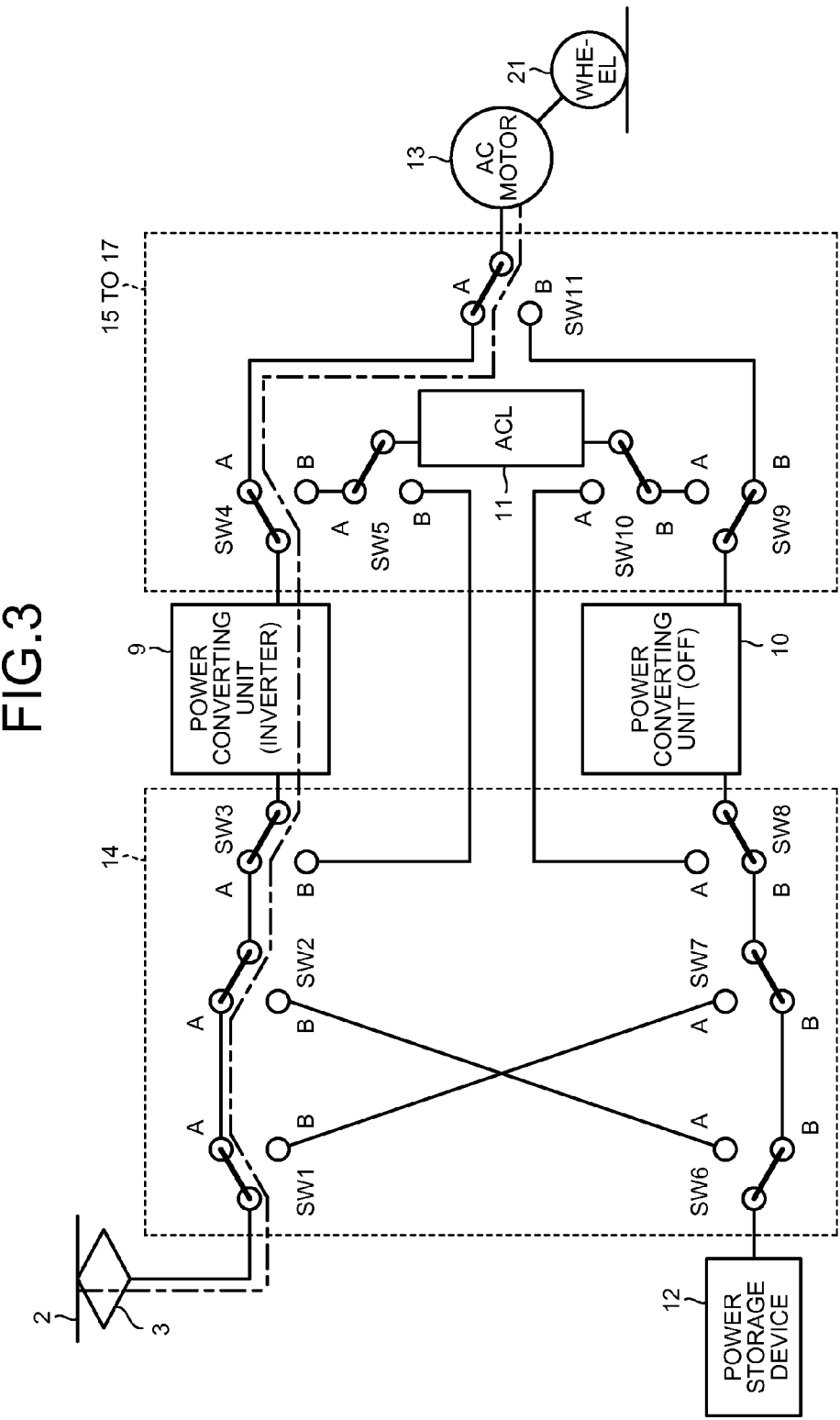
FIG. 3 is a diagram of an operation (motor driving 1) in driving an AC motor using electric power of a direct-current overhead wire.

FIG. 3 is a diagram of an operation (motor driving 1) in driving the AC motor 13 using electric power of the direct-current overhead wire 2. In the case of the motor driving 1, as shown in the figure, the contacts of the SWs 1 to 4 and 11 are set on the A side. Note that the contacts of the other SWs 5 to 10 are arbitrary. The power converting unit 10 stops the operation.

In the connection state explained above, a power supply route extending from the direct-current overhead wire 2 to the AC motor 13 through the power converting unit 9 is formed. The power converting unit 9 operates as an inverter, converts a direct-current voltage supplied from the direct-current overhead wire 2 into a three-phase alternating-current voltage, and drives the AC motor 13. The operation shown in FIG. 3 is executed during power running, brake control, and the like.

(Motor Driving Performed Using Electric Power of the Power Storage Device: Motor Driving 2)

Figure 4:
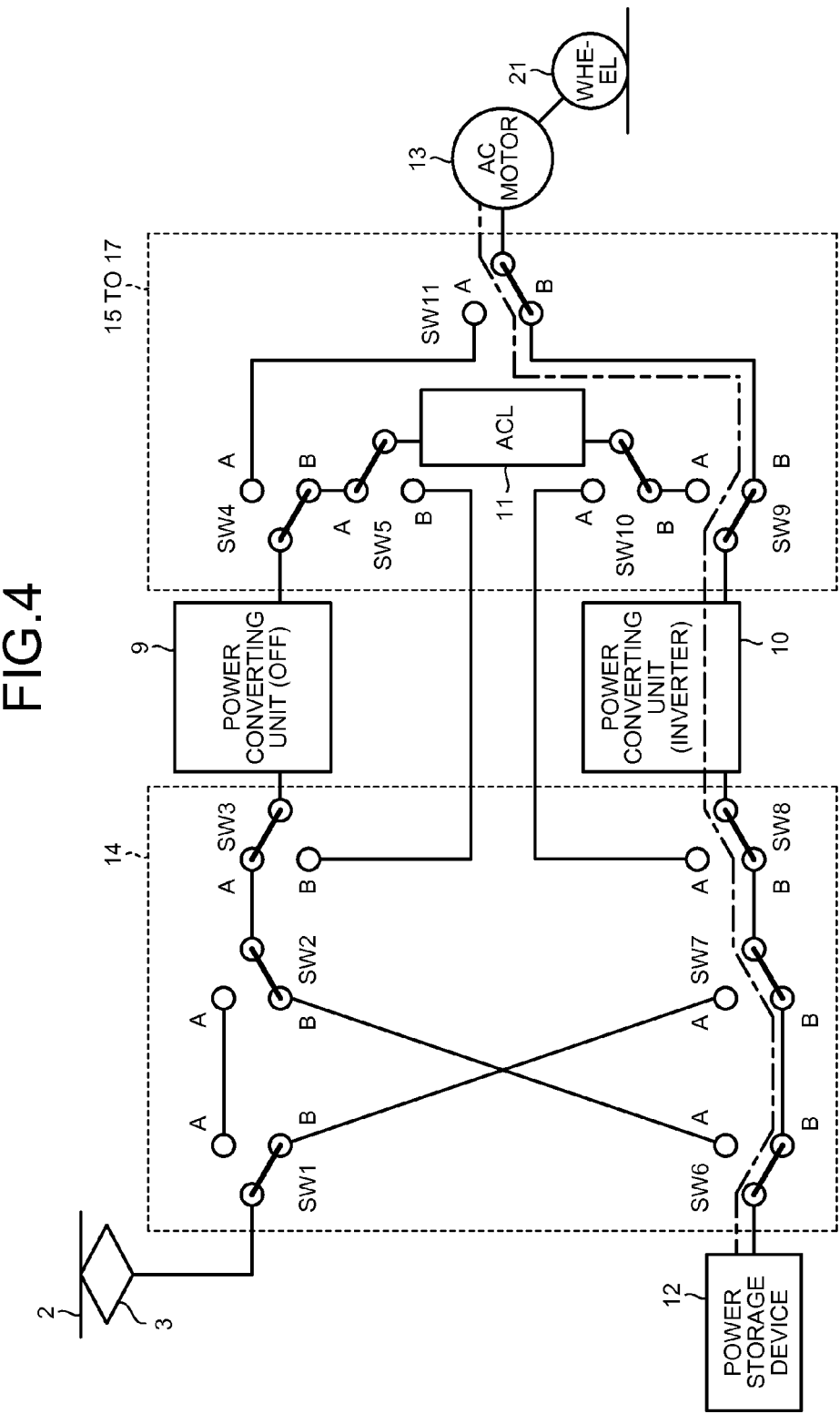
FIG. 4 is a diagram of an operation (motor driving 2) in driving the AC motor using electric power of the power storage device.

FIG. 4 is a diagram of an operation (motor driving 2) in driving the AC motor 13 using electric power of the power storage device 12. In the case of the motor driving 2, as shown in the figure, the contacts of the SWs 6 to 9 and 11 are set on the B side. Note that the contacts of the other SWs 1 to 5 and 10 are arbitrary. The power converting unit 9 stops the operation.

In the connection state explained above, a power supply route extending from the power storage device 12 to the AC motor 13 through the power converting unit 10 is formed. The power converting unit 10 operates as an inverter, converts a direct-current voltage supplied from the power storage device 12 into a three-phase alternating-current voltage, and drives the AC motor 13. As in the case of FIG. 3, the operation shown in FIG. 4 is executed during power running, brake control, and the like.

(Charging the Power Storage Device from the Direct-Current Overhead Wire: Charging Operation 2)

Figure 5:
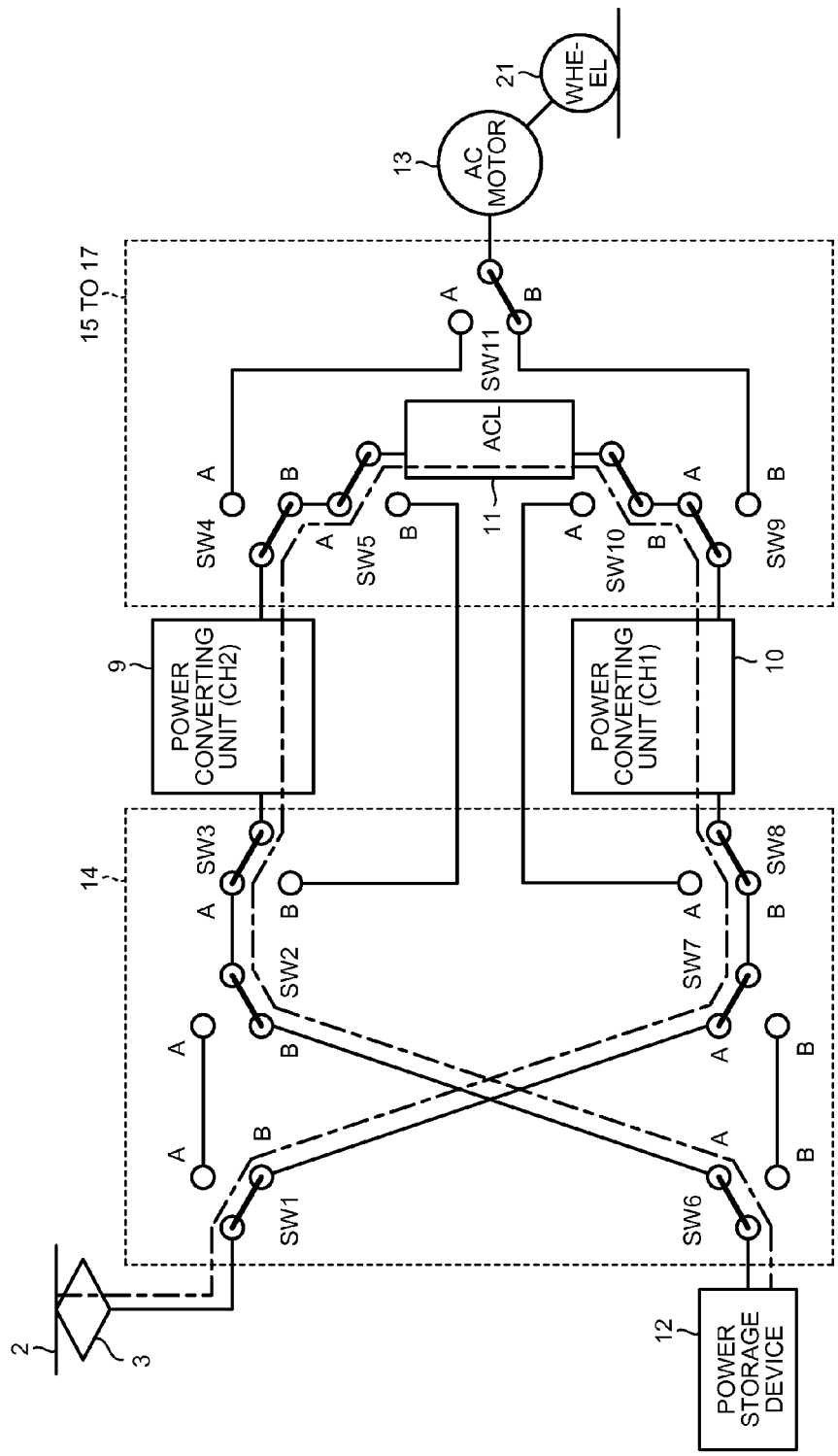
FIG. 5 is a diagram of an operation (a charging operation 2) in charging the power storage device.

FIG. 5 is a diagram of an operation (a charging operation 2) in charging the power storage device 12. The charging operation 2 is an operation for charging the power storage device 12 through a power supply route different from the power supply route in the charging operation 1 shown in FIG. 2. In the case of the charging operation 2, as shown in the figure, the contacts of the SWs 1, 2, 4, and 8 to 10 are set on the B side and the contacts of the SWs 3 and 5 to 7 are set on the A side. Note that the contact of the SW 11 is arbitrary.

In the connection state explained above, a power supply route extending from the direct-current overhead wire 2 to the power storage device 12 through the power converting unit 10, the ACL 11, and the power converting unit 9 is formed. The power converting unit 10 operates as the first chopper (CH1) and the power converting unit 9 operates as the second chopper (CH2) to charge the power storage device 12. Like the operation (the charging operation 1) shown in FIG. 2, the operation (the charging operation 2) shown in FIG. 5 is carried out in a state in which the electric motor car is stopped in a rail yard or a station or a state in which the electric motor car is performing coasting drive in an electrified section.

When the voltage of the direct-current overhead wire 2 is lower than the voltage of the power storage device 12, both the power converting units 9 and 10 operate as a step-up chopper as a whole. When the voltage of the direct-current overhead wire 2 is higher than the voltage of the power storage device 12, both the power converting units 9 and 10 operate as a step-down chopper as a whole.

A connection configuration in which both the two power converting units 9 and 10 are used in charging the power storage device 12 is explained with reference to FIG. 5; however, it is also possible to adopt a connection configuration in which only any one of the power converting units 9 and 10 is used. If a connection configuration is adopted in which, for example, a one-circuit two-contact switch is provided between the SW 1 and the SW 2 and one contact of the switch is connected to the ACL 11 through the contact B of the SW 2 and the contact B of the SW 5, it is possible to charge the power storage device 12 using only the power converting unit 10 without using the power converting unit 9. Note that, with a similar connection configuration, it is also possible to charge the power storage device 12 using only the power converting unit 9 without using the power converting unit 10.

(Motor Driving Performed Using Electric Power of the Direct-Current Overhead Wire: Motor Driving 3)

Figure 6:
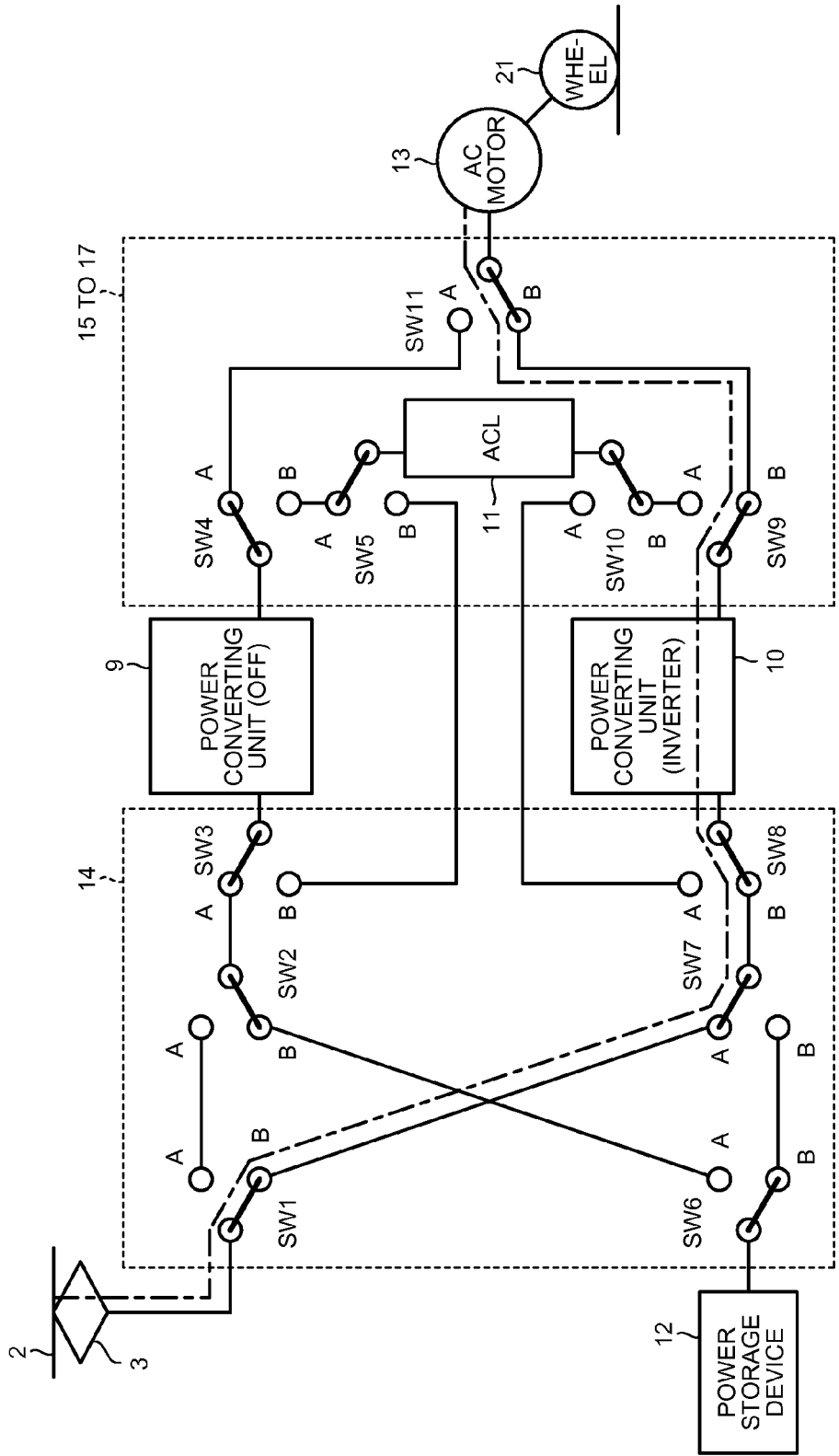
FIG. 6 is a diagram of an operation (motor driving 3) in driving the AC motor using electric power of the direct-current overhead wire.

FIG. 6 is a diagram of an operation (motor driving 3) in driving the AC motor 13 using electric power of the direct-current overhead wire 2. The motor driving 3 is an operation for driving the AC motor 13 using a power supply route and a power converting unit different from those in the motor driving 1 shown in FIG. 3. In the case of the motor driving 3, as shown in the figure, the contacts of the SWs 1, 8, 9, and 11 are set on the B side and the contact of the SW 7 is set on the A side. Note that the contacts of the other SWs 2 to 6 and 10 are arbitrary. The power converting unit 9 stops the operation.

In the connection state explained above, a power supply route extending from the direct-current overhead wire 2 to the AC motor 13 through the power converting unit 10 is formed. The power converting unit 10 operates as an inverter, converts a direct-current voltage supplied from the direct-current overhead wire 2 into a three-phase alternating-current voltage, and drives the AC motor 13. Like the operation (the motor driving 1) shown in FIG. 3 and the like, the operation shown in FIG. 6 is executed during power running, brake control, and the like.

(Motor Driving Performed Using Electric Power of the Power Storage Device: Motor Driving 4)

Figure 7:
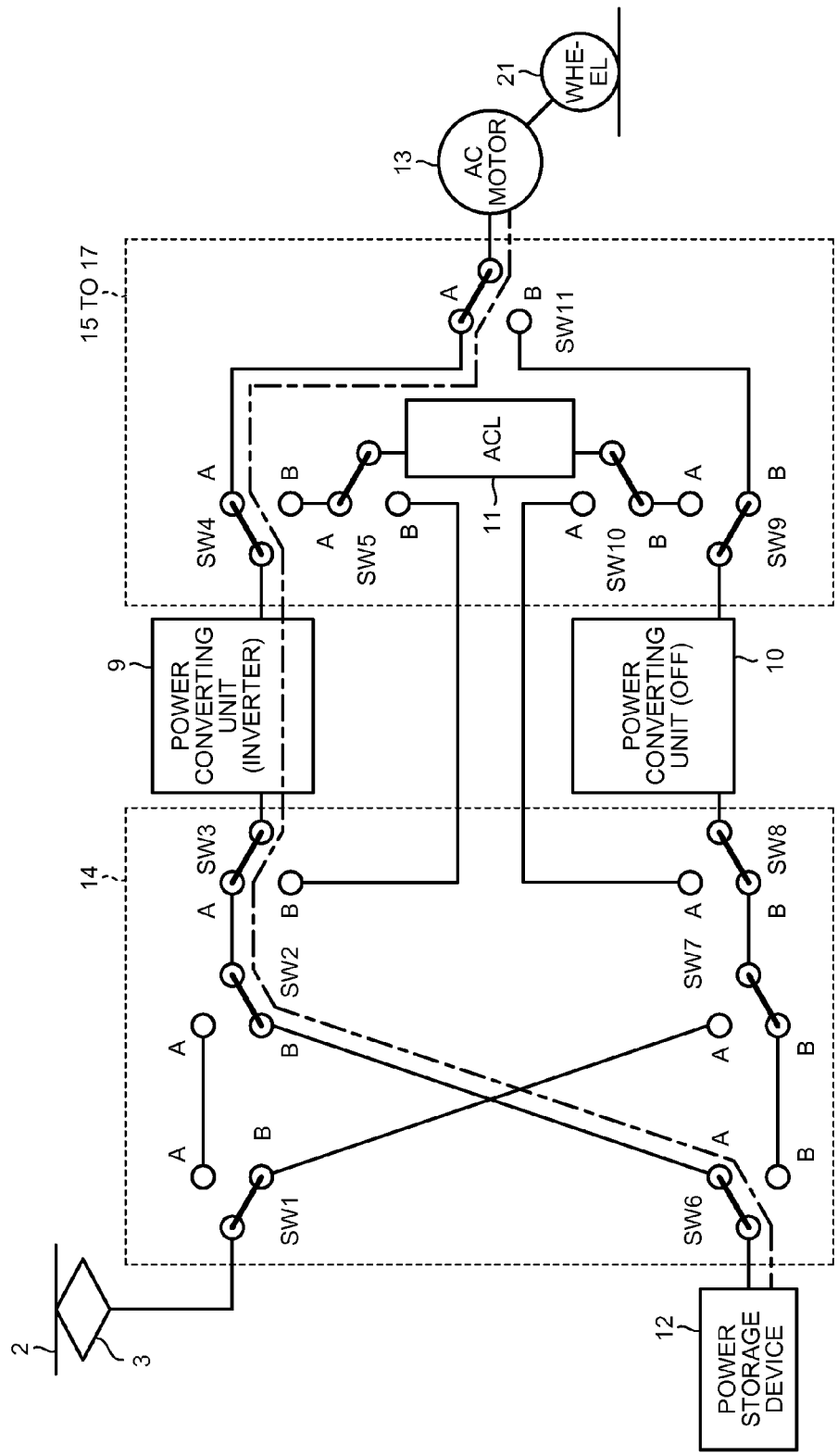
FIG. 7 is a diagram of an operation (motor driving 4) in driving the AC motor using electric power of the power storage device.

FIG. 7 is a diagram of an operation (motor driving 4) in driving the AC motor 13 using electric power of the power storage device 12. The motor driving 4 is an operation for driving the AC motor 13 using a power supply route and a power converting unit different from those in the motor driving 2 shown in FIG. 4. In the case of the motor driving 4, as shown in the figure, the contacts of the SWs 2 and 7 are set on the B side and the contacts of the SWs 3, 4, 6, and 11 are set on the A side. Note that the contacts of the other SWs 1, 5, and 8 to 10 are arbitrary. The power converting unit 10 stops the operation.

In the connection state explained above, a power supply route extending from the power storage device 12 to the AC motor 13 through the power converting unit 9 is formed. The power converting unit 9 operates as an inverter, converts a direct-current voltage supplied from the power storage device 12 into a three-phase alternating-current voltage, and drives the AC motor 13. Like the operation (the motor driving 2) shown in FIG. 4, the operation shown in FIG. 7 is executed during power running, brake control, and the like.

(Motor Driving Performed Using Electric Power of the Direct-Current Overhead Wire: Motor Driving 5)

Figure 8:
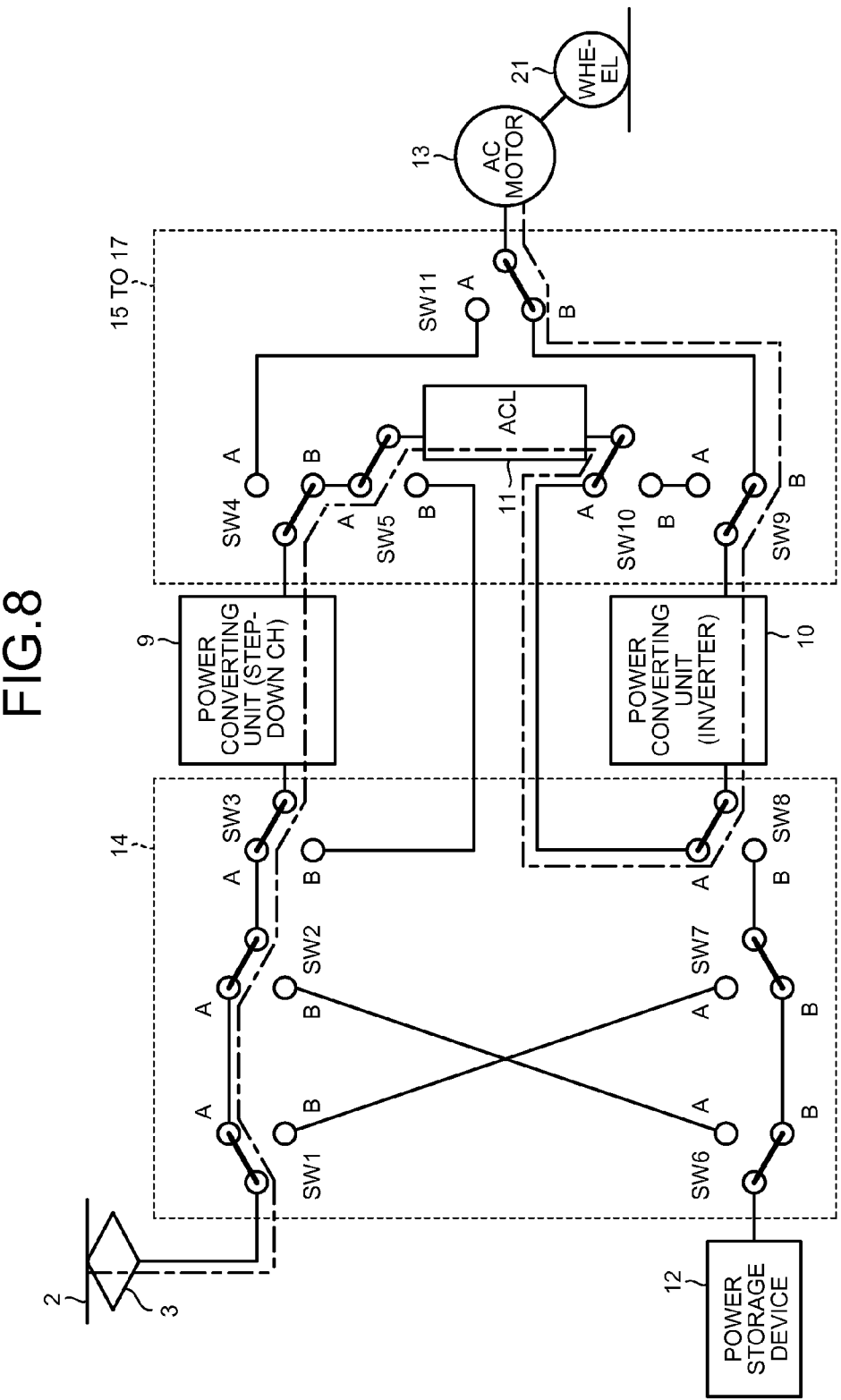
FIG. 8 is a diagram of an operation (motor driving 5) in driving the AC motor using electric power of the direct-current overhead wire.

FIG. 8 is a diagram of an operation (motor driving 5) in driving the AC motor 13 using electric power of the direct-current overhead wire 2. The motor driving 5 is an operation for, after stepping down the voltage of the direct-current overhead wire 2, subjecting the voltage to DC/AC conversion and driving the AC motor 13. In the case of the motor driving 5, as shown in the figure, the contacts of the SWs 1 to 3, 5, 8, and 10 are set on the A side and the contacts of the SWs 4, 9, and 11 are set on the B side. Note that the contacts of the other SWs 6 and 7 are arbitrary.

In the connection state explained above, a power supply route extending from the direct-current overhead wire 2 to the AC motor 13 through the power converting unit 9, the ACL 11, and the power converting unit 10 is formed. The power converting unit 9 operates as a step-down chopper and converts a direct-current voltage supplied from the direct-current overhead wire 2 into a desired direct-current voltage suitable for the operation of the power converting unit 10. The power converting unit 10 operates as an inverter, converts the desired direct-current voltage converted by the power converting unit 9 into a three-phase alternating-current voltage, and drives the AC motor 13. Like the operation (the motor driving 1) shown in FIG. 3 and the like, the operation shown in FIG. 8 is executed during power running, brake control, and the like.

In FIG. 8, an example in which the power supply route extending from the direct-current overhead wire 2 to the AC motor 13 through the power converting unit 9, the ACL 11, and the power converting unit 10 is formed to drive the AC motor 13 is shown; however, a power supply route extending from the direct-current overhead wire 2 to the AC motor 13 through power converting unit 10, the ACL 11, the power converting unit 9 may be formed to drive the AC motor 13. In this case, the power converting unit 10 operates as a step-down chopper and the power converting unit 9 operates as an inverter.

(Motor Driving Performed Using Electric Power of the Power Storage Device: Motor Driving 6)

Figure 9:
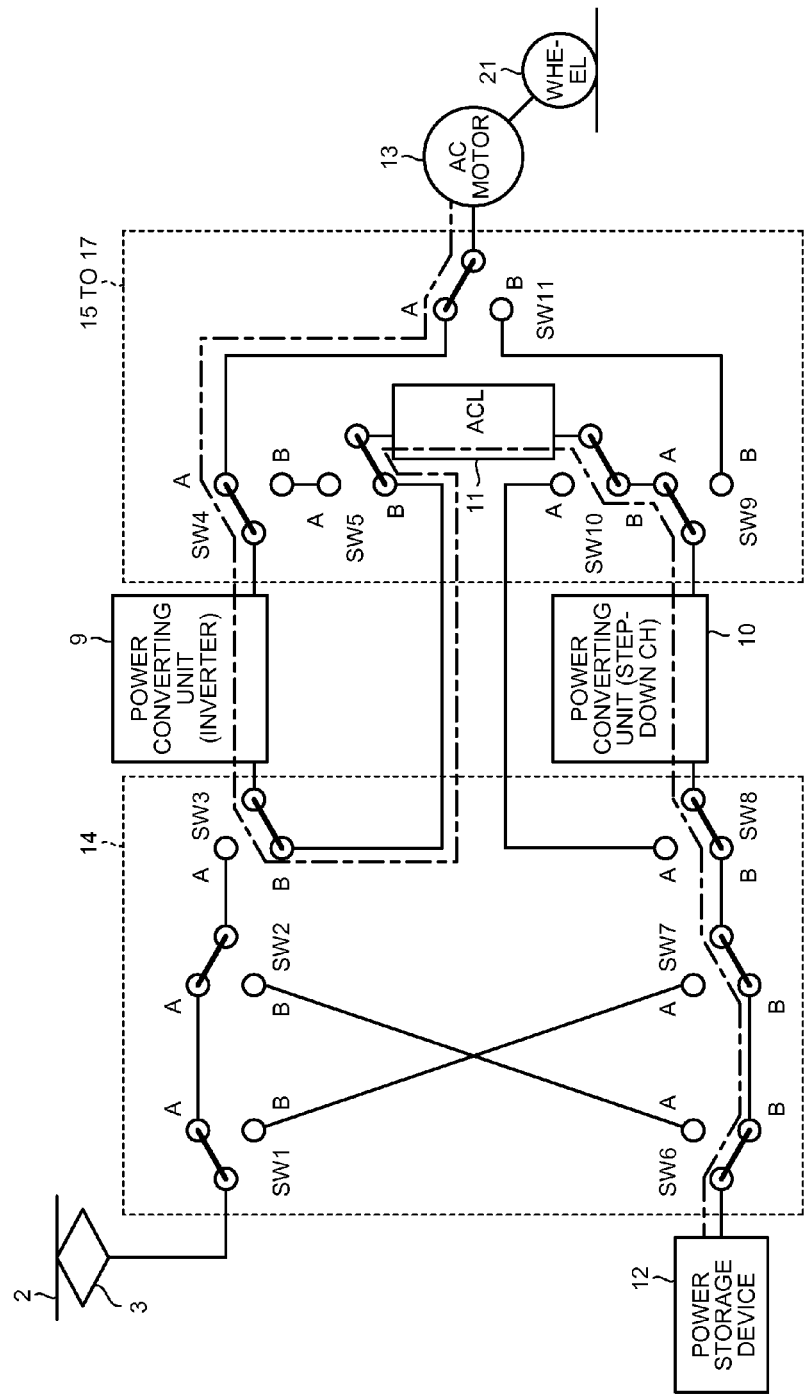
FIG. 9 is a diagram of an operation (motor driving 6) in driving the AC motor using electric power of the power storage device.

FIG. 9 is a diagram of an operation (motor driving 6) in driving the AC motor 13 using electric power of the power storage device 12. The motor driving 6 is an operation for, after stepping down the voltage of the power storage device 12, subjecting the voltage to DC/AC conversion and driving the AC motor 13. In the case of the motor driving 6, as shown in the figure, the contacts of the SWs 3, 5 to 8, and 10 are set on the B side and the contacts of the SWs 4, 9, and 11 are set on the A side. Note that the contacts of the other SWs 1 and 2 are arbitrary.

In the connection state explained above, a power supply route extending from the power storage device 12 to the AC motor 13 through the power converting unit 10, the ACL 11, and the power converting unit 9 is formed. The power converting unit 10 operates as a step-down chopper and converts a direct-current voltage supplied from power storage device 12 into a desired direct-current voltage suitable for the operation of the power converting unit 9. The power converting unit 9 operates as an inverter, converts the desired direct-current voltage converted by the power converting unit 10 into a three-phase alternating-current voltage, and drives the AC motor 13. Like the operation shown in FIG. 3, the operation shown in FIG. 9 is executed during power running, brake control, and the like.

In FIG. 9, an example in which the power supply route extending from the power storage device 12 to the AC motor 13 through the power converting unit 10, the ACL 11, and the power converting unit 9 is formed to drive the AC motor 13 is shown; however, a power supply route extending from the power storage device 12 to the AC motor 13 through power converting unit 9, the ACL 11, the power converting unit 10 may be formed to drive the AC motor 13. In this case, the power converting unit 9 operates as a step-down chopper and the power converting unit 10 operates as an inverter.

(Motor Driving Performed Using Electric Power of Both the Direct-Current Overhead Wire and the Power Storage Device: Motor Driving 7)

Figure 10:
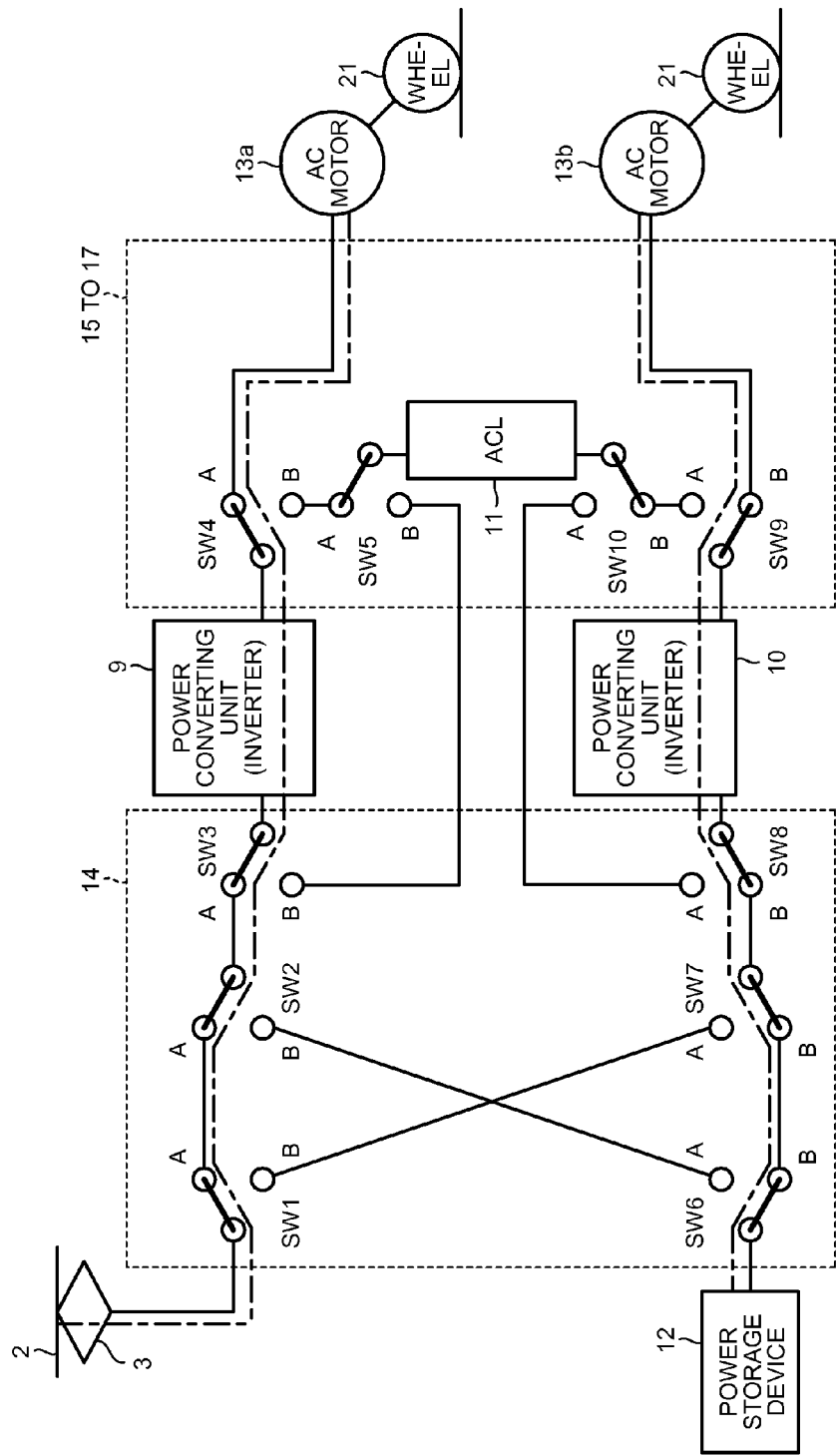
FIG. 10 is a diagram of an operation (motor driving 7) in driving a plurality of the AC motors using electric power of both the direct-current overhead wire and the power storage device.

The motor drivings 1 to 6 are embodiments for driving one motor using electric power supplied from one of the direct-current overhead wire and the power storage device. On the other hand, FIG. 10 is a diagram of an operation (motor driving 7) in driving a plurality of AC motors 13a and 13b using electric power of both the direct-current overhead wire and the power storage device. In an example shown in FIG. 10, the power converting unit 9 is configured to drive the AC motor 13a, which is a first motor, using electric power of the direct-current overhead wire 2, and the power converting unit 10 is configured to drive the AC motor 13b, which is a second motor, using electric power of the power storage device 12. Note that the SW 11 provided in the configurations shown in FIGS. 2 to 9 is omitted. In the case of the motor driving 7, as shown in the figure, the contacts of the SWs 1 to 4 are set on the A side and the contacts of the SWs 6 to 9 are set on the B side. The contacts of the other SWs 5 and 10 are arbitrary.

In the connection state explained above, a first power supply route extending from the direct-current overhead wire 2 to the AC motor 13*a*, which is the first motor, through the power converting unit 9 and a second power supply route extending from the power storage device 12 to the AC motor 13*b*, which is the second motor, through the power converting unit 10 are formed. The power converting unit 9 operates as an inverter, converts a direct-current voltage supplied from the direct-current overhead wire 2 into a three-phase alternating-current voltage, and drives the AC motor 13*a*. The power converting unit 10 also operates as an inverter, converts a direct-current voltage supplied from the power storage device 12 into a three-phase alternating-current voltage, and drives the AC motor 13*b*. Like the operation (the motor driving 1) shown in FIG. 3 and the like, the operation for driving the AC motors 13*a* and 13*b* is executed during power running, brake control, and the like.

Note that the AC motors 13*a* and 13*b* shown in FIG. 10 may be AC motors provided in the same car or may be AC motors provided in different cars. What is important is that, for example, as shown in FIG. 10, AC motors to be driven are connected to predetermined power converting units by switching devices and the like and control units of the cars are associated with each other between the cars.

(Motor Driving Performed Using Electric Power of Both the Direct-Current Overhead Wire and the Power Storage Device: Motor Driving 8)

Figure 11:
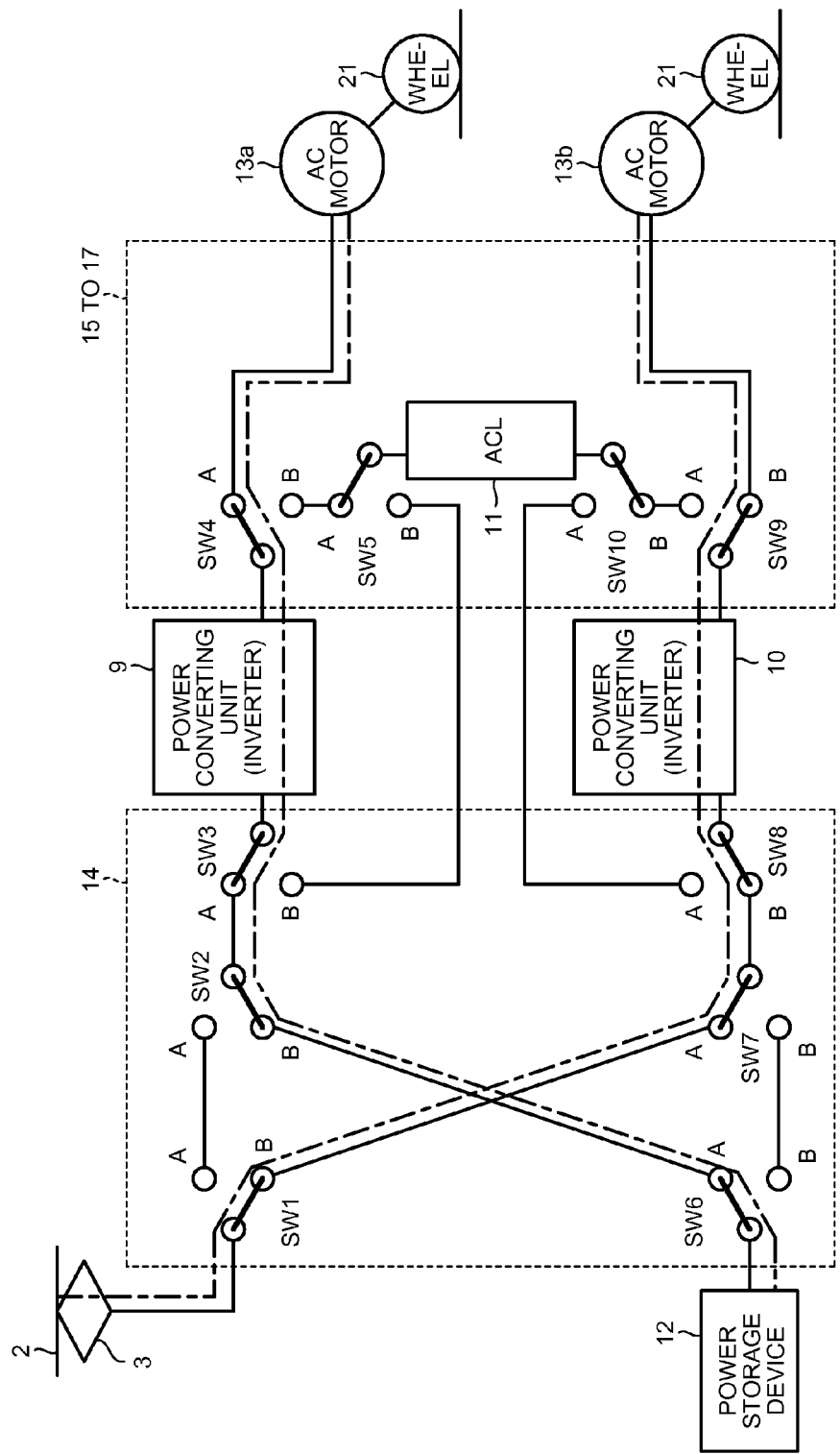
FIG. 11 is a diagram of an operation (motor driving 8) in driving the AC motors using electric power of both the direct-current overhead wire and the power storage device.

FIG. 11 is a diagram of an operation (motor driving 8) in driving the AC motors 13*a* and 13*b* using electric power of both the direct-current overhead wire and the power storage device. FIG. 11 is different from FIG. 10 only in that combinations of the direct-current power supply sources and the power converting units are different. That is, in FIG. 10, the connection configuration is adopted in which electric power of the direct-current overhead wire 2 is supplied to the power converting unit 9 and electric power of the power storage device 12 is supplied to the power converting unit 10; however, in FIG. 11, a connection configuration is adopted in which electric power of the direct-current overhead wire 2 is supplied to the power converting unit 10 and electric power of the power storage device 12 is supplied to the power converting unit 9. In the case of the motor driving 8, as shown in the figure, the contacts of the SWs 1, 2, 8, and 9 are set on the B side and the contacts of the SWs 3, 4, 6, and 7 are set on the A side. The contacts of the other SWs 5 and 10 are arbitrary.

In the connection state explained above, a first power supply route extending from the power storage device 12 to the AC motor 13*a*, which is the first motor, through the power converting unit 9 and a second power supply route extending from the direct-current overhead wire 2 to the AC motor 13*b*, which is the second motor, through the power converting unit 10 are formed. The power converting unit 9 operates as an inverter, converts a direct-current voltage supplied from the power storage device 12 into a three-phase alternating-current voltage, and drives the AC motor 13*a*. The power converting unit 10 also operates as an inverter, converts a direct-current voltage supplied from the direct-current overhead wire 2 into a three-phase alternating-current voltage, and drives the AC motor 13*b*. Like the operation (the motor driving 1) shown in FIG. 3 and the like, the operation for driving the AC motors 13*a* and 13*b* is executed during power running, brake control, and the like. Note that, like the motor driving 7 shown in FIG. 10, the AC motors 13*a* and 13*b* shown in FIG. 11 may be AC motors provided in the same car or may be AC motors provided in different cars.

FIG. 12 is a diagram of a list in a table format of the operations shown in FIG. 2 to FIG. 11. FIG. 12 shows setting states of the SWs 1 to 11, operation states of the power converting units 9 and 10, operation states of the AC motor 13 (13*a* and 13*b*), correspondence relations with the drawings explained above, and the like. The content shown in the figure is as explained above. Therefore, detailed explanation of the content is omitted.

As explained above, in the propulsion control apparatus in this embodiment, two power converting units are provided, and the two power converting units . . . ; therefore, there is an effect that, even when one power converting unit breaks down, car traveling is enabled by the other power converting unit.

Note that the configuration explained in the embodiment described above is an example of the configuration of the present invention. The configuration can be combined with another publicly-known technology or can be changed to, for example, omit a part of the configuration without departing from the spirit of the present invention.

For example, when a plurality of cars in which the propulsion control apparatuses in this embodiment are mounted (hereinafter referred to as "hybrid cars") are coupled, if the power storage devices 12 in the cars are connected in parallel and the power converting units of at least one hybrid car are caused to operate as a bidirectional step-up/down chopper to charge the power storage devices, the cars can travel without consuming electric power of the power storage devices in an electrified section under an overhead wire. According to this control, when the car is used as a hybrid car that travels in both of an electrified section and a non-electrified section, there is room in a power storage device capacity when the car travels in the non-electrified section. This is effective for a reduction in the power storage device capacity.

When power storage devices (power storage devices different from the power storage device mounted on the car) are set in a rail yard and a station, while the car is stopped in the rail yard or the station, at least one of the power converting units 9 and 10 can be caused to operate as a DC/DC converter to charge an external power storage device instead of the power storage device 12 included in the own car. According to this control, it is possible to charge the power storage device at low costs. Further, a charging facility for the power storage device is unnecessary in the rail yard and the station. Further, if the power storage device is charged in a period of time when an electricity rate is low such as at night, it is possible to attain a further reduction in costs.

When the car travels in both the electrified section and the non-electrified section and a direct-current electrified section and an alternating-current electrified section are present in the electrified section, if three or more hybrid cars are coupled, the power storage devices 12 in the cars are coupled in parallel to one another, the power converting units of at least one hybrid car are caused to operate as a bidirectional step-up/down chopper, and the power converting units of at least one hybrid car are caused to operate as a converter, electric power from the overhead wire can be received in both the direct-current electrified section and the alternating-current electrified section and the car can travel without consuming electric power of the power storage device in the electrified section under the overhead wire. According to this control, even when the car travels in both the electrified section and the non-electrified section and both the direct-current electrified section and the alternating-current electrified section are present in the electrified section, there is room in a power storage device capacity when the car travels in the non-electrified section. This is effective for a reduction in the power storage device capacity.

In the above explanation, the propulsion control apparatus of the railway car is explained as an example; however, an embodiment in which a car does not need to be associated with other cars can be applied to hybrid mobile bodies (an automobile, a motorcycle, etc.), hybrid construction machines (a dump truck, a bulldozer, an excavator, etc.), and the like mounted with power storage devices (a lithium ion battery, a nickel-metal hydride battery, an electric double layer capacitor, a lithium ion capacitor, a flywheel, etc.), and also can be applied to the field of ships.

INDUSTRIAL APPLICABILITY

As explained above, the propulsion control apparatus for the electric motor car according to the present invention is useful as an invention for enabling, even when one power converting unit breaks down, car traveling with the other power converting unit.

REFERENCE SIGNS LIST 1 direct-current power supply
2 direct-current overhead wire
3 power collector
6, 26 current limiting resistor
7 FL (filter reactor)
8 FC (filter capacitor)
9, 10 power converting unit
11 ACL (alternating-current reactor)
12 power storage device
13, 13a, 13b alternating-current (AC) motor
14, 15, 16, 17 switching device
18 speed detector
21 wheel
23, 35a, 35b, 36a, 36b, 37 current detector
29 BFC (battery filter capacitor)
32 SIV (auxiliary power supply device)
33 auxiliary machine
40 control unit
41, 42, 43, 44, 45 switch
50 propulsion control apparatus

The invention claimed is:

1. A propulsion control apparatus for an electric motor car that includes a power storage device and an alternating-current motor and performs propulsion control on the alternating-current motor using direct-current power supplied from a direct-current overhead wire and the power storage device, the apparatus comprising:

first and second power converting units that are capable of performing bidirectional power flow control and operate as at least any one of a step-up chopper, a step-down chopper, a step-up/down chopper, and an inverter according to a connection form;

an alternating-current reactor provided on a side of each of alternating-current ends of the first and second power converting units;

a first switching device that has a switching function of switching which one of the power storage device and the direct-current overhead wire is connected to a direct-current end side of the first power converting unit and switching which one of the power storage device and the direct-current overhead wire is connected to a direct-current end side of the second power converting unit;

a second switching device that has a switching function of connecting the alternating-current end of the first power converting unit to either the alternating-current reactor side or the alternating-current motor side and, when neither of the power storage device and the direct-current overhead wire is connected to the direct-current end side of the first power converting unit, connecting the direct-current end of the first power converting unit to the alternating-current reactor;

a third switching device that has a switching function of connecting the alternating-current end of the second power converting unit to either the alternating-current reactor side or the alternating-current motor side and, when neither of the power storage device and the direct-current overhead wire is connected to the direct-current end side of the second power converting unit, connecting the direct-current end of the second power converting unit to the alternating-current reactor;

a fourth switching device that switches a connection of the alternating-current motor to either the first power converting unit side or the second power converting unit side; and a control unit that controls an operation of the first and second power converting units and an operation of the first to fourth switching devices.

2. The propulsion control apparatus for an electric motor car according to claim 1, wherein, when the power storage device is charged using electric power of the direct-current overhead wire, the control unit controls the first switching device to connect an output of the direct-current overhead wire to the direct-current end side of the first power converting unit and connect the direct-current end of the second power converting unit to the power storage device side, controls the second switching device to connect the alternating-current end of the first power converting unit to the alternating-current reactor, controls the third switching device to connect the alternating-current end of the second power converting unit to the alternating-current reactor, and causes the first and second power converting units to perform a chopper operation to charge the power storage device.

3. The propulsion control apparatus for an electric motor car according to claim 1, wherein, when the power storage device is charged using electric power of the direct-current overhead wire, the control unit controls the first switching device to connect an output of the direct-current overhead wire to the direct-current end side of the second power converting unit and connect the direct-current end of the first power converting unit to the power storage device side, controls the second switching device to connect the alternating-current end of the first power converting unit to the alternating-current reactor, controls the third switching device to connect the alternating-current end of the second power converting unit to the alternating-current reactor, and causes the first and second power converting units to perform a chopper operation to charge the power storage device.

4. The propulsion control apparatus for an electric motor car according to claim 2, wherein, when a voltage of the direct-current overhead wire is lower than a voltage of the power storage device, the control unit causes at least one of the first and second power converting units to perform a step-up chopper operation to charge the power storage device.

5. The propulsion control apparatus for an electric motor car according to claim 2, wherein, when a voltage of the direct-current overhead wire is higher than a voltage of the power storage device, the control unit causes at least one of the first and second power converting units to perform a step-down chopper operation to charge the power storage device.

6. The propulsion control apparatus for an electric motor car according to claim 1, wherein, when the alternating-current motor is driven using electric power of the direct-current overhead wire, the control unit
- controls the first switching device to connect an output of the direct-current overhead wire to the direct-current end side of the first power converting unit,
- controls the second and fourth switching devices to connect the alternating-current end of the first power converting unit to the alternating-current motor, and
- causes the first power converting unit to perform an inverter operation to drive the alternating-current motor.

7. The propulsion control apparatus for an electric motor car according to claim 1, wherein, when the alternating-current motor is driven using electric power of the direct-current overhead wire, the control unit
- controls the first switching device to connect an output of the direct-current overhead wire to the direct-current end side of the second power converting unit,
- controls the third and fourth switching devices to connect the alternating-current end of the second power converting unit to the alternating-current motor, and
- causes the second power converting unit to perform an inverter operation to drive the alternating-current motor.

8. The propulsion control apparatus for an electric motor car according to claim 1, wherein, when the alternating-current motor is driven using electric power of the power storage device, the control unit
- controls the first switching device to connect an output of the power storage device to the direct-current end side of the first power converting unit,
- controls the second and fourth switching devices to connect the alternating-current end of the first power converting unit to the alternating-current motor, and
- causes the first power converting unit to perform an inverter operation to drive the alternating-current motor.

9. The propulsion control apparatus for an electric motor car according to claim 1, wherein, when the alternating-current motor is driven using electric power of the power storage device, the control unit
- controls the first switching device to connect an output of the power storage device to the direct-current end side of the second power converting unit,
- controls the third and fourth switching devices to connect the alternating-current end of the second power converting unit to the alternating-current motor, and
- causes the second power converting unit to perform an inverter operation to drive the alternating-current motor.

10. The propulsion control apparatus for an electric motor car according to claim 1, wherein, when the alternating-current motor is driven using electric power of the direct-current overhead wire, the control unit
- controls the first switching device to connect an output of the direct-current overhead wire to the direct-current end side of the first power converting unit,
- controls the second switching device to connect the alternating-current end of the first power converting unit to the alternating-current reactor,
- controls the first and third switching devices to connect the direct-current end of the second power converting unit to the alternating-current reactor,
- controls the third and fourth switching devices to connect the alternating-current end of the second power converting unit to the alternating-current motor, and
- causes the first power converting unit to perform a step-down chopper operation and causes the second power converting unit to perform an inverter operation to drive the alternating-current motor.

11. The propulsion control apparatus for an electric motor car according to claim 1, wherein, when the alternating-current motor is driven using electric power of the direct-current overhead wire, the control unit
- controls the first switching device to connect an output of the direct-current overhead wire to the direct-current end side of the second power converting unit,
- controls the third switching device to connect the alternating-current end of the second power converting unit to the alternating-current reactor,
- controls the first and second switching devices to connect the direct-current end of the first power converting unit to the alternating-current reactor,
- controls the second and fourth switching devices to connect the alternating-current end of the first power converting unit to the alternating-current motor, and
- causes the second power converting unit to perform a step-down chopper operation and causes the first power converting unit to perform an inverter operation to drive the alternating-current motor.

12. The propulsion control apparatus for an electric motor car according to claim 1, wherein, when the alternating-current motor is driven using electric power of the power storage device, the control unit
- controls the first switching device to connect an output of the power storage device to the direct-current end side of the second power converting unit,
- controls the third switching device to connect the alternating-current end of the second power converting unit to the alternating-current reactor,
- controls the first and second switching devices to connect the direct-current end of the first power converting unit to the alternating-current reactor,
- controls the second and fourth switching devices to connect the alternating-current end of the first power converting unit to the alternating-current motor, and
- causes the second power converting unit to perform a step-down chopper operation and causes the first power converting unit to perform an inverter operation to drive the alternating-current motor.

13. The propulsion control apparatus for an electric motor car according to claim 1, wherein, when the alternating-current motor is driven using electric power of the power storage device, the control unit
- controls the first switching device to connect an output of the power storage device to the direct-current end side of the first power converting unit,
- controls the second switching device to connect the alternating-current end of the first power converting unit to the alternating-current reactor,
- controls the first and third switching devices to connect the direct-current end of the second power converting unit to the alternating-current reactor,
- controls the third and fourth switching devices to connect the alternating-current end of the second power converting unit to the alternating-current motor, and causes the first power converting unit to perform a step-down chopper operation and causes the second power converting unit to perform an inverter operation to drive the alternating-current motor.

14. The propulsion control apparatus for an electric motor car according to claim 3, wherein, when a voltage of the direct-current overhead wire is lower than a voltage of the power storage device, the control unit causes at least one of the first and second power converting units to perform a step-up chopper operation to charge the power storage device.

15. The propulsion control apparatus for an electric motor car according to claim 3, wherein, when a voltage of the direct-current overhead wire is higher than a voltage of the power storage device, the control unit causes at least one of the first and second power converting units to perform a step-down chopper operation to charge the power storage device.

16. A propulsion control apparatus for an electric motor car that includes a power storage device and an alternating-current motor, the apparatus comprising:
   first and second power converting units capable of performing bidirectional power flow control;
   an alternating-current reactor provided on a side of each of alternating-current ends of the first and second power converting units;
   a first switching device that has a switching function of connecting the power storage device to either a direct-current end side of the first power converting unit or a direct-current end side of the second power converting unit;
   a second switching device that has a switching function of connecting the alternating-current end of the first power converting unit to either the alternating-current reactor side or the alternating-current motor side and, when the power storage device is not connected to the direct-current end side of the first power converting unit, connecting the direct-current end of the first power converting unit to the alternating-current reactor;
   a third switching device that has a switching function of connecting the alternating-current end of the second power converting unit to either the alternating-current reactor side or the alternating-current motor side and, when the power storage device is not connected to the direct-current end side of the second power converting unit, connecting the direct-current end of the second power converting unit to the alternating-current reactor;
   a fourth switching device that has a switching function of connecting the alternating-current motor to either the first power converting unit side or the second power converting unit side; and
   a control unit that controls an operation of the first and second power converting units and an operation of the first to fourth switching devices.

17. A propulsion control apparatus for an electric motor car that includes a power storage device and first and second alternating-current motors and performs propulsion control on the first and second alternating-current motors using direct-current power supplied from a direct-current overhead wire and the power storage device, the apparatus comprising:
   first and second power converting units that are capable of performing bidirectional power flow control and operate as at least any one of a step-up chopper, a step-down chopper, a step-up/down chopper, and an inverter according to a connection form;
   an alternating-current reactor provided on a side of each of alternating-current ends of the first and second power converting units;
   a first switching device that performs connection switching such that one of the power storage device and the direct-current overhead wire is connected to each of direct-current ends of the first and second power converting units;
   a second switching device that switches a connection of the alternating-current end of the first power converting unit to either the alternating-current reactor or the first alternating-current motor;
   a third switching device that switches a connection of the alternating-current end of the second power converting unit to either the alternating-current reactor or the second alternating-current motor; and
   a control unit that controls an operation of the first and second power converting units and an operation of the first to third switching devices.

18. The propulsion control apparatus for an electric motor car according to claim 17, wherein
   when the first alternating-current motor is driven using electric power of the direct-current overhead wire, the control unit
      controls the first switching device to connect an output of the direct-current overhead wire to the direct-current end side of the first power converting unit,
      controls the second switching device to connect the alternating-current end of the first power converting unit to the first alternating-current motor, and
      causes the first power converting unit to perform an inverter operation to drive the first alternating-current motor, and
   when the second alternating-current motor is driven using electric power of the power storage device, the control unit
      controls the first switching device to connect an output of the power storage device to the direct-current end side of the second power converting unit,
      controls the third switching device to connect the alternating-current end of the second power converting unit to the second alternating-current motor, and
      causes the second power converting unit to perform an inverter operation to drive the second alternating-current motor.

19. The propulsion control apparatus for an electric motor car according to claim 17, wherein
   when the first alternating-current motor is driven using electric power of the power storage device, the control unit
      controls the first switching device to connect an output of the power storage device to the direct-current end side of the first power converting unit,
      controls the second switching device to connect the alternating-current end of the first power converting unit to the first alternating-current motor, and
      causes the first power converting unit to perform an inverter operation to drive the first alternating-current motor, and
   when the second alternating-current motor is driven using electric power of the direct-current overhead wire, the control unit
      controls the first switching device to connect an output of the direct-current overhead wire to the direct-current end side of the second power converting unit,
      controls the third switching device to connect the alternating-current end of the second power converting unit to the second alternating-current motor, and
      causes the second power converting unit to perform an inverter operation to drive the second alternating-current motor.

* * * * *